United States Patent
Sampson et al.

[11] Patent Number: 6,130,179
[45] Date of Patent: Oct. 10, 2000

[54] PURIFIED ATTAPULGITE CLAY

[75] Inventors: Paul Sampson, Monkton; Dennis Parker, Sparks; David Ruff, Cockeysville, all of Md.

[73] Assignee: ITC, Inc., Baltimore, Md.

[21] Appl. No.: 09/190,528

[22] Filed: Nov. 12, 1998

[51] Int. Cl.7 .................................................. B01J 21/16
[52] U.S. Cl. ...................... 502/62; 502/80; 501/148; 241/24.23; 209/5; 209/47
[58] Field of Search .................. 502/62, 80; 501/148; 241/24.23; 209/5, 47

[56] References Cited

U.S. PATENT DOCUMENTS

| | | | |
|---|---|---|---|
| 3,596,760 | 8/1971 | Jacobs et al. | 209/5 |
| 3,617,561 | 11/1971 | Fanselow | 210/47 |
| 4,782,120 | 11/1988 | Rousset et al. | 525/326.6 |
| 4,915,845 | 4/1990 | Leighton et al. | 210/701 |
| 4,966,871 | 10/1990 | Brooks | 501/150 |
| 5,021,094 | 6/1991 | Brown et al. | 106/803 |
| 5,358,120 | 10/1994 | Gantt et al. | 209/4 |
| 5,783,628 | 7/1998 | Yada et al. | 525/59 |
| 5,938,833 | 8/1999 | Willis et al. | 106/487 |

*Primary Examiner*—Tom Dunn
*Attorney, Agent, or Firm*—Leonard Bloom

[57] ABSTRACT

A method for producing an attapulgite clay (Fuller's Earth) that significantly removes other types of clays and minerals, resulting in improved performance. A unique dispersant is used that will fully disperse the individual attapulgite particles in water such that the particles remain in suspension, and said dispersant will not fully disperse other clay and mineral species, which then can be easily separated through various techniques. The attapulgite clay may be recovered from the dispersion and dried in such a manner to produce a finely sized powder from ore, without the need for any grinding or milling operation. The dried attapulgite clay with adsorbed dispersant is redispersed in water and retain thixotropic properties.

24 Claims, 3 Drawing Sheets

PURIFIED ATTAPULGITE CLAY

FIELD OF INVENTION

This invention relates to the ability to treat naturally occurring attapulgite clay deposits and more particularly, to selectively disperse discrete, individual particles of attapulgite while leaving other present clay types, such as montmorillonite, sepiolite, bentonite, and kaolin, in their un-dispersed naturally occurring agglomerated state.

BACKGROUND OF THE INVENTION

Attapulgite clay (Fuller's Earth) particles naturally occur as colloidally dimensioned, high aspect ratio needle-like shaped crystals that are bundled together, and the bundles are agglomerated into clusters. As the attapulgite deposits were formed, other clay types were formed simultaneously or were introduced through air and water movements. Other mineral types also were formed in place or transported into the deposits during their formation, resulting in a variety of non-attapulgite materials being present in levels approaching 20 weight percent or more. In order for the attapulgite to be in a physical form acceptable for commercial use, it needs to be processed into a powder. The attapulgite clay is historically processed by a grinding or milling operation, followed by particle size separation and drying to a moisture content of approximately 10%. The non-attapulgite matter is also reduced in size and partially removed during the particle size classification operation. The non-clay minerals can be abrasive and must either be removed or reduced in size to lessen their abrasive characteristics in order for the attapulgite powder to be useful in end use applications.

A grinding/milling operation will partially break up the bundle clusters with the undesirable result of fracturing of individual attapulgite particles. The individual attapulgite particles provide the thixotropic, anti-settling, and/or binding properties to the end use application. Particles with higher length to width, or aspect ratios, typically are more efficient than particles with lower aspect ratios.

In end use applications, a chemical dispersant, predominantly tetrasodium pyrophosphate (TSPP), will at best, separate a majority of the attapulgite bundles into individual particles in an aqueous medium under moderate-to-high shear agitation. However, TSPP will also disperse other clay types present. Individual clay particles of each clay species present, will remain suspended in water. U.S. Pat. No. 3,569,760 has shown that non-clay minerals will not remain suspended in the water and will settle to the bottom due to gravitational forces if the clay-water slurry is low enough in viscosity. The relatively large non-clay minerals, which by their means of higher hardness, can resist size reduction and thus can also be removed by screening, centrifuging, via sedimentation tanks, hydrocyclone, or other physical separation means. The non-attapulgite clay minerals, such as montmorillonite and sepiolite, will remain mixed in with the attapulgite clay. The non-attapulgite clays do not have the same performance characteristics as attapulgite clay, some which are detrimental to performance in particular applications. At the present time, the suppliers and users of attapulgite are dependent on the quality of natural deposits for the concentration of non-attapulgite clay content. The availability of high purity attapulgite clay relies on the economically inefficient selective mining of the deposits.

Gantt et. al. in U.S. Pat. No. 5,358,120, have shown that other types of previously commercially available dispersants such as sodium polyacrylates can be used with clay. However, sodium polyacrylates with molecular weights less than 4,300, while effective on kaolins and bentonites, are typically not as effective with attapulgite when compared to TSPP, and thus not generally used.

Attapulgite clay provides thixotropic and binding properties through the process of re-flocculating after being typically dispersed at less than 5% solids in an aqueous system, whereby a gel structure is generated. Various salts, at additive levels, can act as re-flocculating agents.

Historically, attapulgite clay is dried to a free moisture content of approximately, 10–16%, with an 8 or 9% minimum. At lower moisture contents, the attapulgite begins to lose its thixotropic properties and does not readily re-disperse in water. Brooks, in U.S. Pat. No. 4,966,871, has shown that it is possible to vacuum dry attapulgite down to less than 2% and still retain its thixotropic properties, the importance being that the attapulgite is dried under vacuum conditions.

Attapulgite clay is frequently used as an additive product, often comprising only 1 to 3 weight percent of the final composition. Attapulgite clay does not disperse completely in a liquid medium at these low concentrations. The believed cause is the lack of clay to clay collisions needed to break up the agglomerates and bundles. A technique used to overcome this behavior is one in which a 20 to 25% slurry is made, and when completely dispersed, it is diluted with water down to the desired ultimate concentration.

There is a need to be able to efficiently and economically separate attapulgite clay from other clay types and from non-clay minerals.

SUMMARY OF THE INVENTION

It is an object of the invention to provide an economical and efficient method to separate attapulgite clay from other clay components and minerals in clay ore.

It is a further object of the invention to provide a purified attapulgite clay.

It is yet another object of the invention to provide dry attapulgite clay particles which are readily dispersed in water without addition of dispersant or surfactant.

It is a further object of the present invention to provide a dry particulate attapulgite clay which has less than 0.5% free moisture content and retains thixotropic properties.

In accordance with the teachings of the present invention, there is disclosed a method of processing naturally occurring clay ore to separate attapulgite clay from other materials. This includes the steps of crushing the clay ore, adding sodium polyacrylate to water, the sodium polyacrylate having a molecular weight between 4,000 and 5,000, preparing a slurry of the clay ore with the aqueous sodium polyacrylate to disperse the attapulgite clay in the water, separating the dispersed attapulgite clay from un-dispersed materials, and drying the dispersed attapulgite clay.

Further, in accordance with the teachings of the present invention, there is disclosed attapulgite clay which has separated from non-attapulgite type clay matter wherein the non-attapulgite type clay matter includes sepiolite, montmorillonite, bentonite-type and non-clay grit, the attapulgite clay being in the form of particulem.

These and other objects of the present invention will become apparent from a reading of the following specification, taken in conjunction with the enclosed drawings.

DESCRIPTION OF THE PREFERRED EMBODIMENTS

We have made the unexpected discovery that the efficiency of a particular sodium polyacrylate, which preferably has a molecular weight of approximately 4,700, allows for higher concentrations of attapulgite clay in a water slurry at a lower viscosity than is attainable when using TSPP or other sodium polyacrylate dispersants having lower molecular weights. The practical upper limit for the attapulgite concentration when using TSPP as the dispersant is approximately 25%, above which the viscosity becomes too high for handling, and less than 25% solids for other sodium polyacrylates with lower molecular weights. The approximate 4,700 MW sodium polyacrylate imparts the ability to prepare at least 35% concentration attapulgite slurry and still have acceptable handling characteristics. This property offers the economic advantage of more efficient manufacture of formulations that begin with a 25% slurry that is diluted down to a lower concentration (typically 1–3% used in suspension fertilizers) as fewer slurry batches need to be prepared to yield the same amount of final product.

Figure 1:
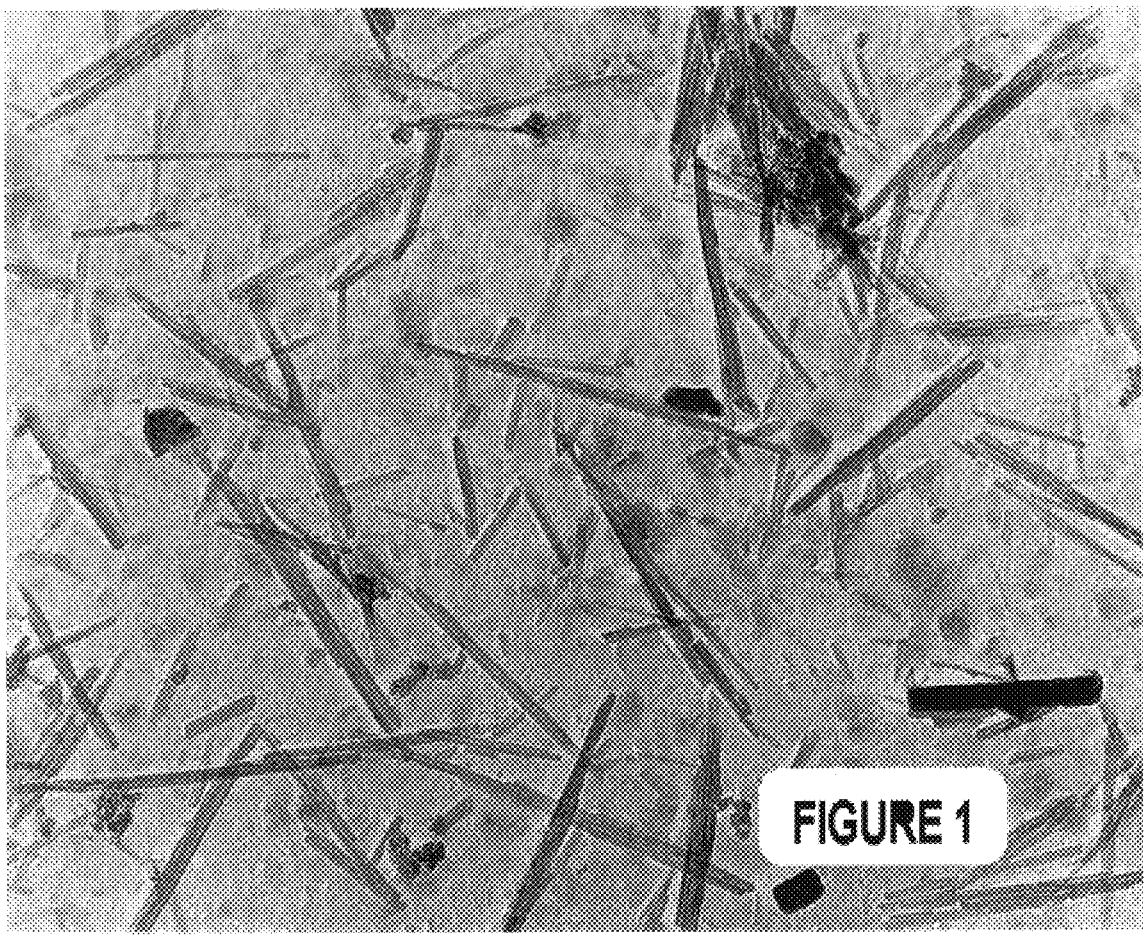
FIG. 1 is an enlarged view of dispersed attapulgite crystals.
Figure 2:
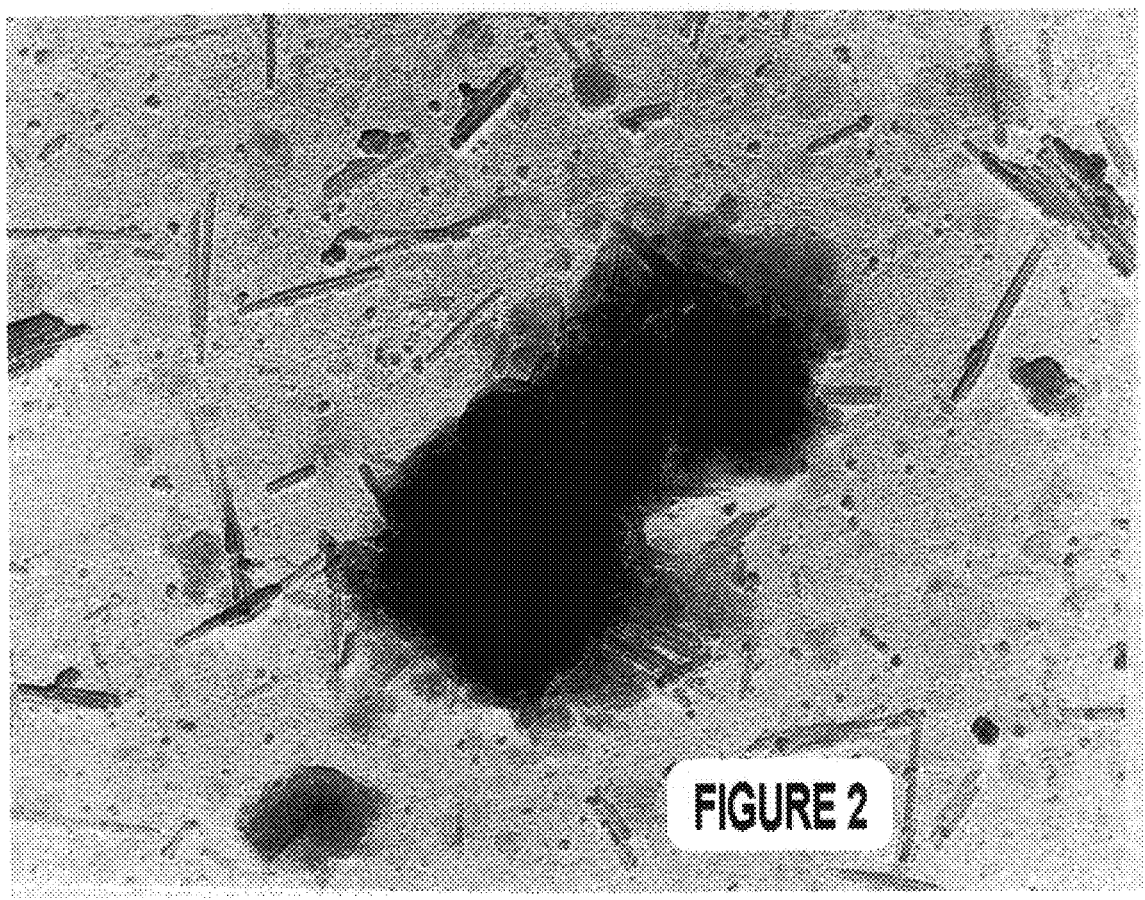
FIG. 2 is an enlarged view of a smectite/attapulgite cluster.
Figure 3:
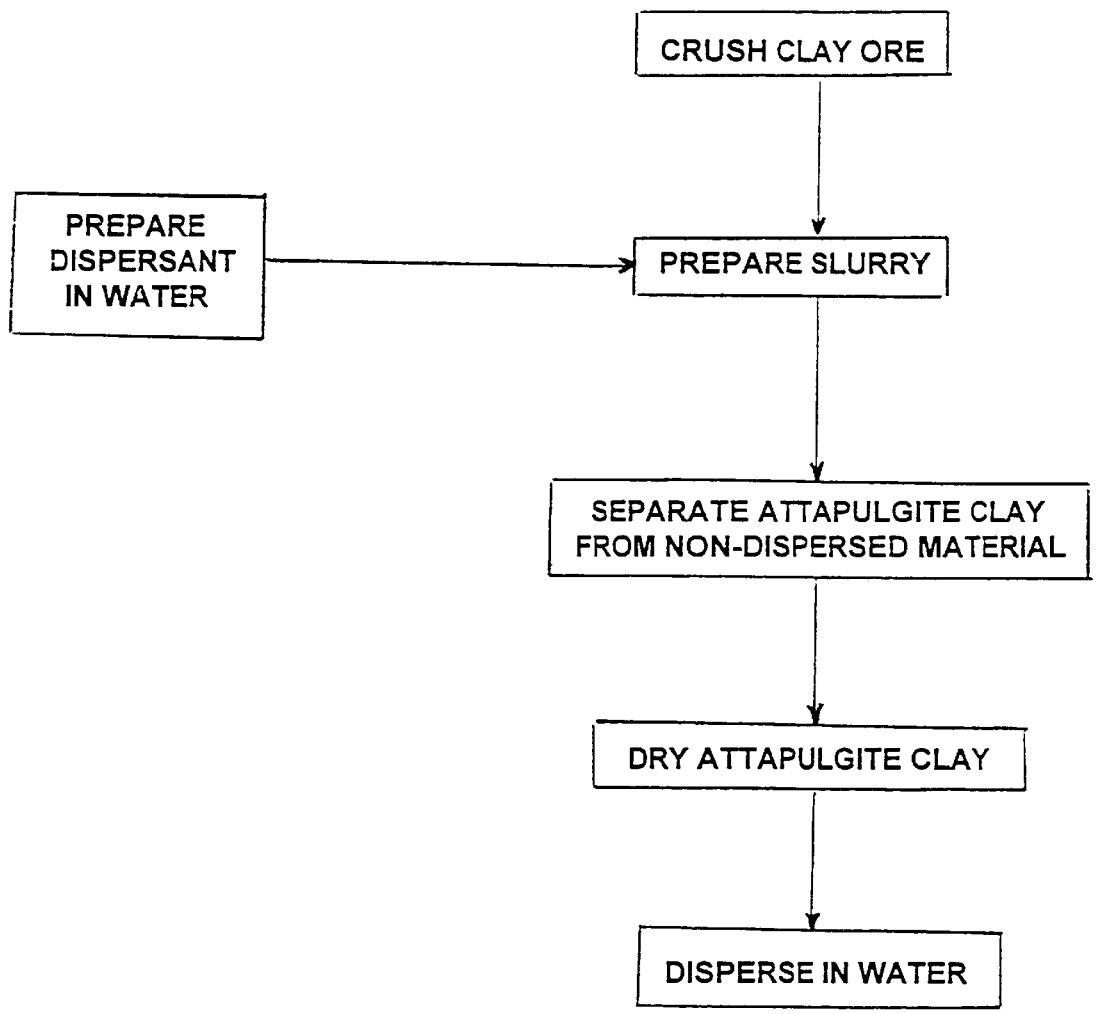
FIG. 3 is a diagram of the purification of attapulgite clay.

When further studied, we have made an additional unexpected discovery that by using said higher molecular weight sodium polyacrylate, the attapulgite particles will disperse with significantly improved efficiency in water under moderate-to-high shear conditions, (see FIG. 1.) and will disperse other clays present to a less extent than TSPP will. The result is that more of the non-attapulgite clays present will remain as relatively large particles, along with the non-clay matter present. The attapulgite particles will form a colloidal suspension. The undispersed non-attapulgite clays can be easily removed by physical means along with the non-clay matter. The result is an increased purity form of attapulgite that is essentially grit free. The relatively lower molecular weight sodium polyacrylates tested will not disperse the attapulgite particles as efficiently, thus achieving less separation of attapulgite and non-attapulgite clay particles. See FIG. 2 where the molecular weight of the sodium polyacrylate used is 2,600.

We have further discovered that when attapulgite is dried, the sodium polyacrylate remains adsorbed on the attapulgite particles. The dried attapulgite will readily re-disperse into water without the need for a dispersant or surfactant to be pre-mixed into the water. In addition, with the removal of non-attapulgite clay, higher performance is observed in the ability to provide thixotropy, binding, and suspension behavior.

Another unexpected discovery was the ability of the residual sodium polyacrylate to allow the attapulgite to retain its thixotropic properties when dried to less than 0.5% moisture at atmospheric pressure, without the need for vacuum drying and/or a silicone or silane type stabilizer.

Attapulgite clay ore is mined and crushed into pieces small enough so that they can be blunged into a slurry. The sodium polyacrylate dispersant, having a molecular weight range of between 4,000 and 5,000 is pre-mixed with water. The sodium polyacrylate concentration preferably is between 1 and 4 weight % of the attapulgite clay content. The attapulgite clay is gradually added under moderate-to-high shear to the water—sodium polyacrylate solution, until fully dispersed. The attapulgite bundles and clusters become separated into colloidal particles while some of the other the clay species present, remain agglomerated in relatively large particles. The undispersed non-attapulgite clay particles are removed along with the non-clay matter, via physical means. The de-gritted attapulgite clay is then de-watered or dried until the desired residual moisture content is achieved. Preferably, the drying process is at atmospheric pressure at a temperature between 85° C. and 210° C. During the drying process, the attapulgite particles 'self-coalesce' into loosely bound granules. They do not re-flocculate into tightly bound bundles and agglomerates.

The final form may include a filter cake or a dried powder. The filter cake and/or the dried powder can be easily re-dispersed into water without the use of additional dispersant. One effective drying method which may be employed is spray drying. Spray drying offers the ability to produce uniformly sized granules whose size can be controlled by adjusting the process conditions in the spray dryer. Thus, finely sized attapulgite granules can be made without a grinding or milling procedure that would fracture the attapulgite needles, thereby reducing performance.

EXAMPLES 1 THROUGH 9

Samples of various quality attapulgite clay were slurried, using between 1.0 and 1.8 weight percent, on a dry clay basis, of sodium polyacrylate with a molecular weight between 4,000 and 5,000. The slurries consisted of approximately 25 weight % clay in de-ionized or distilled water. The sodium polyacrylate was mixed with the water until a homogeneous solution was achieved, then the clay was gradually added under moderate-to-high shear, until completely wetted. The slurries were filtered with a 325 mesh screen and then dried into a free flowing powder. X-ray and Atomic Absorption analysis methods were used to compare the compositional quality of the raw material and the finished material. The following species were identified: attapulgite, smectite clay (i.e., montmorillonite, sepiolite), quartz, calcite, dolomite, apatite, illite, mica, kaolinite, as well as other trace minerals. The results are listed below in Table 1.

TABLE 1

| M'tl ID | % Attapulgite | % Smectite | % Quartz | % Calcite |
| --- | --- | --- | --- | --- |
| #1 | 85 | 2 | 7 | <1 |
| #2 | 85 | 2 | 4 | ND* |
| #3 | 90 | 1 | 3 | ND |
| #4 | 85 | 1 | 6 | ND |
| #5 | 90 | 1 | 3 | ND |
| #6 | 85 | 1 | 6 | ND |
| #7 | 90 | <1 | 3 | ND |
| #8 | 60 | 30 | 3 | ND |
| #9 | 60 | 25 | 4 | <1 |

*ND not detected

Specimen #1, the reference specimen, is a relatively high quality grade with 85% attapulgite content, with a low 2% smectite content, without any processing. Specimen #2, the control specimen, which is specimen #1 that was processed according to the preceding paragraph, except that TSPP was used as the dispersant in place of sodium polyacrylate. Specimen #2 did not exhibit any purification other than some grit removal during the screening. The attapulgite and smectite contents remained the same. Specimen #3 was also processed from Specimen #1, according to the preceding paragraph, this time using the above-identified sodium polyacrylate dispersant. Specimen # 3 tested with an increase in attapulgite content from 85 to 90%. The smectite content decreased 1%. The remaining 4% is comprised of an additional 1% reduction of quartz plus reduced amounts of apatite, illite and mica. This can be attributed to the increased dispersion of the attapulgite bundles, freeing up more entrapped contaminant particles via physical separation. Specimens # 4 and # 6 are two other grades of attapulgite clay, a low and high gelling grade, respectively which have been processed with TSPP but without the sodium polyacrylate dispersant. Specimens # 5 and # 7 are the corresponding specimens treated with the sodium polyacrylate dispersant. In both cases, the attapulgite content increased from 85 to 90%. Specimen # 8 is a relatively impure attapulgite, with a high smectite content of 30%. Upon processing with the sodium polyacrylate dispersant, (Specimen #9) the smectite content is reduced from 30 to 25%, along with a drop in illite/mica content from 6% to 1%.

EXAMPLE 10

A specimen of attapulgite clay, with a moisture content of between 8 and 13 weight %, was dispersed in water at 35% solids, using said sodium polyacrylate dispersant. The viscosity was measured at 300 cPs using a Brookfield RVT viscometer. The slurry was then de-gritted with a 325 mesh screen and dried at 105° C. at atmospheric pressure to a powder to approximately the original moisture content. The de-gritted attapulgite was then re-slurried into water at 35% solids without the use of any additional dispersant. The viscosity was then measured at 340 cPs. The slight increase is proportional to the amount of grit removed and the results can be considered similar and within experimental reproducibility.

EXAMPLE 11

A specimen of attapulgite clay was dispersed using said sodium polyacrylate dispersant in water at 35% solids. The slurry was de-gritted and spray dried to yield a dry, powdered attapulgite. The free moisture content was determined and the viscosity was measured at an industry standard quality control test level of 7% solids in water. The attapulgite powder was then dried further at approximately 105° C. to produce various free moisture content specimens. These specimens were subsequently tested for their respective viscosities and ability to re-flocculate into a gel structure that provides thixotropic performance.

TABLE 2

| Free Moisture Content (%) | Viscosity @ 7% solids in water (cPs) |
|---|---|
| 9 | 10 |
| 5 | 8 |
| 1 | 8 |
| 1 | 6 |
| 0.5 | 6 |
| <0.1 | 6 |

The specimen dried to 0.5% free moisture was re-slurried in water at 7% solids. The viscosity was approximately 6 cPs. Upon the addition of 0.7% (total weight basis) potash, the resulting viscosity obtained was 3,100 cPs; indicating the ability to re-flocculate and generate a gel structure.

EXAMPLE 12

A specimen of attapulgite was slurried into water at 35% solids using various grades of sodium polyacrylate dispersants. The amount of dispersant used was varied between 1 and 2.5% in order to determine the most effective level, using the minimum viscosity obtained as the criteria (an indication of degree of dispersion). The results were recorded as viscosity vs % dispersant added (Table 3). Note: non-crosslinked sodium polyacrylates with molecular weights greater than approximately 4,700 are not known to exist. It can be expected that, if available, they would exhibit similar or improved performance.

TABLE 3

Viscosity vs. Wt. % Dispersant [Molecular Weight]

| Wt % | [4,700] cPs | [4,300] cPs | [3,700] cPs | [2,600] cPs |
|---|---|---|---|---|
| 1 | 1,360 | 4,925 | 4,900 | 6,050 |
| 1.25 | 300 | 860 | 1,900 | 3,850 |
| 1.5 | 730 | 1,160 | 1,555 | 2,700 |
| 1.75 | 1,200 | 855 | 1,755 | 2,800 |
| 2 |  | 2,050 | 2,625 | 3,525 |
| 2.25 |  | 2,750 | 2,125 |  |
| 2.5 |  |  | 3,225 |  |

The observable trend is that higher molecular weight sodium polyacrylates are more efficient dispersants.

In summary, clay ore is purified and separated from non-attapulgite material by dispersing the ore in an aqueous solution of sodium polyacrylate having a molecular weight of approximately 4,000–5,000. Non-attapulgite clays are not dispersed, or only very slightly dispersed, in this sodium polyacrylate solution. Also non-clay material ("grit") is not dispersed. In this manner, the attapulgite clay forms a slurry and can be separated from non-attapulgite material. The slurry is dried to provide a powder of attapulgite clay. There is residual sodium polyacrylate in the dried attapulgite clay such that upon addition of water, the attapulgite redisperses without the addition of further dispersant. The redispersed attapulgite clay retains thixotropic properties. Thus, a purified form of attapulgite clay is provided which is more economical to use due to the absence of non-attapulgite material. Also, poorer quality clay ore can be processed economically to provide purified attapulgite clay.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of processing naturally occurring clay ore to separate attapulgite clay from other materials comprising the steps of:
    crushing the clay ore,
    adding sodium polyacrylate to water, the sodium polyacrylate having a molecular weight between 4,000 and 5,000,
    preparing a slurry of the clay ore with the aqueous sodium polyacrylate to disperse the attapulgite clay in the water,
    separating the dispersed attapulgite clay from un-dispersed materials, and
    drying the dispersed attapulgite clay.

2. The method of claim 1, wherein the sodium polyacrylate content is between 1% and 4% on a dry clay ore basis.

3. The method of claim 1, wherein the separated attapulgite clay content is greater than 30% by weight.

4. The method of claim 1, wherein the attapulgite clay dispersed in water is separated from un-dispersed materials by screening.

5. The method of claim 1, wherein the attapulgite clay dispersed in water is separated from un-dispersed materials by centrifuging.

6. The method of claim 1, wherein the attapulgite clay dispersed in water is separated from un-dispersed materials by gravity settling.

7. The method of claim 1, wherein the slurry of attapulgite clay is dried to a moisture content between 6% and 10%.

8. The method of claim 1, wherein the attapulgite clay slurry is dried in an oven.

9. The method of claim 1, wherein the attapulgite clay slurry is dried by spray drying.

10. The method of claim 1, wherein the attapulgite clay slurry is dried by evaporative filtration.

11. The method of claim 1, wherein the dried attapulgite clay contains sodium polyacrylate sorbed thereon.

12. The method of claim 11, wherein the dried attapulgite clay is added to water with shear agitation and the attapulgite clay is redispersed in the water without the addition of a dispersant or a surfactant.

13. The method of claim 1, wherein the dispersed attapulgite clay is dried at atmospheric pressure at a temperature between 85° C. and 250° C.

14. The method of claim 13, wherein the free moisture content is less than 7%.

15. The method of claim 1, wherein the dried attapulgite clay is in the form of free flowing particles which are clusters of individual attapulgite crystals, avoiding the need for a grinding or milling operation.

16. The method of claim 1, wherein the non-dispersed material is quartz, dolomite, limestone, feldspar, diatomaceous, earth, mica, titania, aluminum montmorillonite, sepiolite, bentonite and kaolin.

17. The method of claim 1, wherein the clay ore is gradually added with shear to the slurry of clay ore in the aqueous sodium polyacrylate.

18. A method of preparing an aqueous dispersion of purified attapulgite clay comprising the steps of:

crushing naturally occurring clay ore, adding sodium polyacrylate to water, the sodium polyacrylate having a molecular weight between 4,000 and 5,000, preparing a slurry of the clay ore with the aqueous sodium polyacrylate to disperse the attapulgite clay in the water, separating the dispersed attapulgite clay from un-dispersed materials, drying the dispersed attapulgite clay, and adding the dried attapulgite clay to water with shear agitation wherein the attapulgite clay is dispersed in the water without the addition of a dispersant or a surfactant.

19. A purified dried, particulate attapulgite clay comprising attapulgite clay separated from non-attapulgite clay matter and sodium polyacrylate adsorbed on the attapulgite clay particles; wherein the sodium polyacrylate has a molecular weight greater than 4000.

20. The attapulgite clay of claim 19, wherein the non-attapulgite clay matter includes sepiolite, montmorillonite, bentonite and non-clay grit.

21. The attapulgite clay of claim 19, wherein the free moisture content of the attapulgite clay particles is between 6% and 14%.

22. The attapulgite clay of claim 19 which is dispersed in water with shear agitation to provide an aqueous slurry without the addition of either a dispersant or a surfactant.

23. The attapulgite clay of claim 19, wherein the separated attapulgite clay is dried at atmospheric pressure between 85° C. and 250° C. to yield a free moisture content of less than 0.5%, the dried attapulgite clay retaining thixotropic properties.

24. A purified dried attapulgite clay able to be dispersed in water and retain thixotropic properties comprising attapulgite clay and sodium polyacrylate sorbed thereon, the sodium polyacrylate having a molecular weight greater than 4,000.

* * * * *